ELECTRONIC SYNCHRONIZING SYSTEM

Filed July 28, 1949

4 Sheets-Sheet 1

INVENTOR.
FRANK A. HESTER
BY
Carl V. Olson
ATTORNEY

INVENTOR.
FRANK A. HESTER
BY Carl V. Olson
ATTORNEY

INVENTOR.
FRANK A. HESTER
BY
Carl V. Olson
ATTORNEY

April 22, 1952

F. A. HESTER 2,593,450

ELECTRONIC SYNCHRONIZING SYSTEM

Filed July 28, 1949

4 Sheets-Sheet 4

INVENTOR.
FRANK A. HESTER
BY
Carl V. Olson
ATTORNEY

Patented Apr. 22, 1952

2,593,450

UNITED STATES PATENT OFFICE 2,593,450

ELECTRONIC SYNCHRONIZING SYSTEM

Frank A. Hester, New York, N. Y., assignor to Faximile, Inc., New York, N. Y., a corporation of Delaware Application July 28, 1949, Serial No. 107,161

9 Claims. (Cl. 318—341)

This invention relates to systems for synchronizing the operation of one equipment with the operation of another equipment, and more particularly to synchronizing systems of the electronic type. While the present invention relates to a system for synchronizing the speed of a motor with received synchronizing signals, it will be understood that various subcombinations of the invention are adapted for use in many ways apparent to those skilled in the art.

While not limited thereto, the present invention is particularly useful when applied to the facsimile art wherein it is common practice to scan copy line by line and to utilize a space between the signals representing each line for the transmission of a synchronizing signal. At the receiving end, the recording electrode may be driven by a motor which must be synchronized with the transmitted signals to reproduce the copy line by line. Synchronizing systems have often included brushes and a commutator driven by the motor. While these systems of the prior art have been found to operate very successfully, they suffer from the disadvantage that the commutators and brushes require frequent cleaning and other attentions. It is therefore a general object of this invention to provide a synchronizing system which is reliable and trouble-free by reason of its not requiring the use of commutators and brushes or other mechanical switching devices.

Another objection to synchronizing systems of the prior art is that they display inertia effects, i. e., in correcting a lead or lag, they tend to overcompensate and "hunt." This failing is especially objectionable in facsimile equipment because a permanent record is made which continues to give testimony to the imperfectness of the equipment. It is therefore another object of this invention to provide a synchronizing system which is free from inertia effects; i. e., one which does not compensate by means of progressively smaller overcompensations.

A further object is to provide a synchronizing system which provides initial synchronization in a very short period of time and which maintains perfect synchronization thereafter.

A further object is to provide a counter-gate device receptive to a square wave or to periodic pulses and operative to count the pulses and allow every $n$th pulse to "go through" and appear on the output terminals without change in its shape or duration.

A further object is to provide an apparatus adapted to deliver to a motor an alternating driving current which is in exact synchronism with the relatively weak output of a vacuum tube oscillator applied to the apparatus, the apparatus being much simpler and less expensive than a conventional vacuum tube power amplifier.

Pursuant to these and other objects which will be apparent to those skilled in the art, the present invention involves a motor driven by an A.-C. power supply controlled in frequency by a variable-frequency oscillator receptive to a frequency-determining D.-C. voltage stored on a capacitor. A portion of the oscillator energy is applied to an overdriven amplifier to generate a corresponding square wave, which, in turn, is applied to a counter-gate having an output of one half-cycle square pulse per $n$ cycles of the square wave generator. This local pulse is differentiated and the leading spike applied to a circuit for discharging the frequency-determining storage capacitor of the oscillator to a base value. The local pulse and a received synchronizing pulse of comparable width are applied to a thyratron circuit for recharging the frequency-determining storage capacitor to a value which is a function of the duration of time that the pulses overlap. In the normal synchronized condition of operation the pulses will overlap by a certain amount, as, for example, 50 per cent. The mode of operation is such that the frequency of the oscillator is constant during the time between pulses. A synchronizing pulse causes the capacitor to be discharged to a base value and then quickly recharged to a value which determines the frequency of the oscillator until the next pulse arrives.

For a better understanding of the circuits of the present invention and the manner in which they cooperate in the system, reference is had to the following description taken in conjunction with the appended drawings, wherein.

Figure 1:
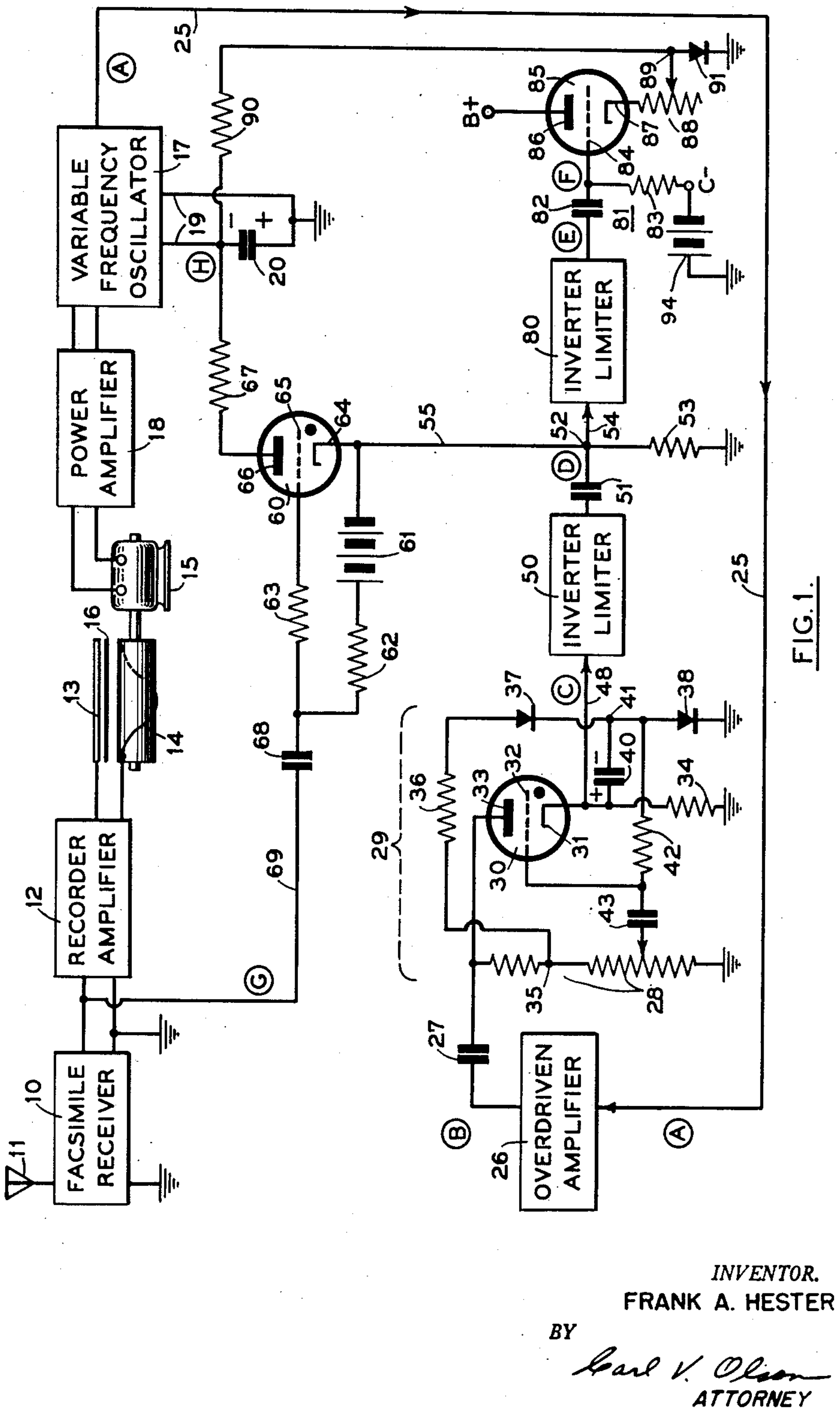
Figure 1 is a facsimile receiving equipment having a synchronizing system constructed in accordance with the teaching of this invention.

Referring now in greater detail to the drawings, facsimile receiver 10 receives facsimile signals from an antenna 11 and after conventional translations applies them through a recorder amplifier 12 to a linear recording electrode 13 and a helical recording electrode 14. The electrode 14 is rotated by motor 15, and electrolytic recording paper 16 passing between the recording electrodes is marked in accordance with the copy scanned at a facsimile transmitting station. The speed of rotation of helical electrode 14 is determined by the frequency of A.-C. power supplied to synchronous motor 15 from variable-frequency oscillator 17 through power amplifier 18. The oscillator 17 includes terminals 19 across which a D.-C. voltage may be applied to determine the frequency of the oscillator. A storage capacitor 20 is employed across the terminals 19 as a voltage or energy storage device which is periodically acted upon by synchronizing signals. The variable-frequency oscillator 17 may be of the type described in a copending application of Frank A. Hester, Serial No. 689,792, filed August 10, 1946.

A portion of the energy in the output circuit of oscillator 17 is conveyed by wire 25 to the input of an overdriven amplifier 26 wherein the sine wave A (of Figure 2) is transformed into a corresponding square wave B of the same frequency. The square wave is applied through coupling capacitor 27 to a voltage divider 28 forming a part of a counter-gate circuit generally designated 29.

Counter-gate 29 includes a gaseous discharge tube 30, as for example a thyratron, having a heated cathode 31, a grid or firing electrode 32, and an anode or plate 33. The plate 33 is connected to the top of voltage divider 28 and the cathode is connected to ground through a load resistor 34. A tap 35 on voltage divider 28 is connected through resistor 36, rectifier 37 and rectifier 38 to ground. Rectifiers 37 and 38 may be thermionic diodes or germanium crystals. A grid biasing capacitor 40 is connected from cathode 31 to point 41 between the rectifiers, and, in series with resistor 42, to the grid 32. A capacitor 43 connected between a tap on voltage divider 28 and grid 32 acts together with resistor 42 as a differentiator to supply a spike or pip to the grid 32 whenever the leading edge of a positive pulse appears on the voltage divider.

In the operation of counter-gate 29, the first positive pulse 44 of waveform B (Figure 2) applied to tube 30 causes it to conduct for the duration of the pulse and this leaves a charge on grid biasing capacitor 40 which prevents the tube 30 from conducting when the next positive pulse 45 is applied to the tube. This next positive pulse, however, partially discharges capacitor 40 by reason of current flowing from tap 35 through resistor 36 and rectifier 37 to the negative side of the capacitor, the amount of discharge being determined by the voltage on capacitor 40, the time duration of the pulse and the values of the R-C constants in the circuit of resistor 36 and capacitor 40. Successive pulses applied to tube 30 progressively discharge capacitor 40 until an $n$th pulse 46, where $n$ may for example be 10, causes the tube to conduct and recharge capacitor 40. The cycle of operation is then repeated. It is to be noted that the tube 30 always begins to conduct at the beginning of the $n$th pulse because a pip is applied to grid 32 from differentiator 42, 43 at the beginning of every pulse. As the charge on grid-biasing capacitor 40 is decreased, the pip applied to grid 32 insures that the tube will fire only at the beginning of a pulse and never between pulses or during a pulse. The circuit has therefore been termed a "counter-gate" because it counts the pulses and allows every $n$th pulse to pass through and appear across the load resistor 34. The circuit has been found to be positive and consistent in operation when $n$ is in the order of 10 and less.

Figure 2:
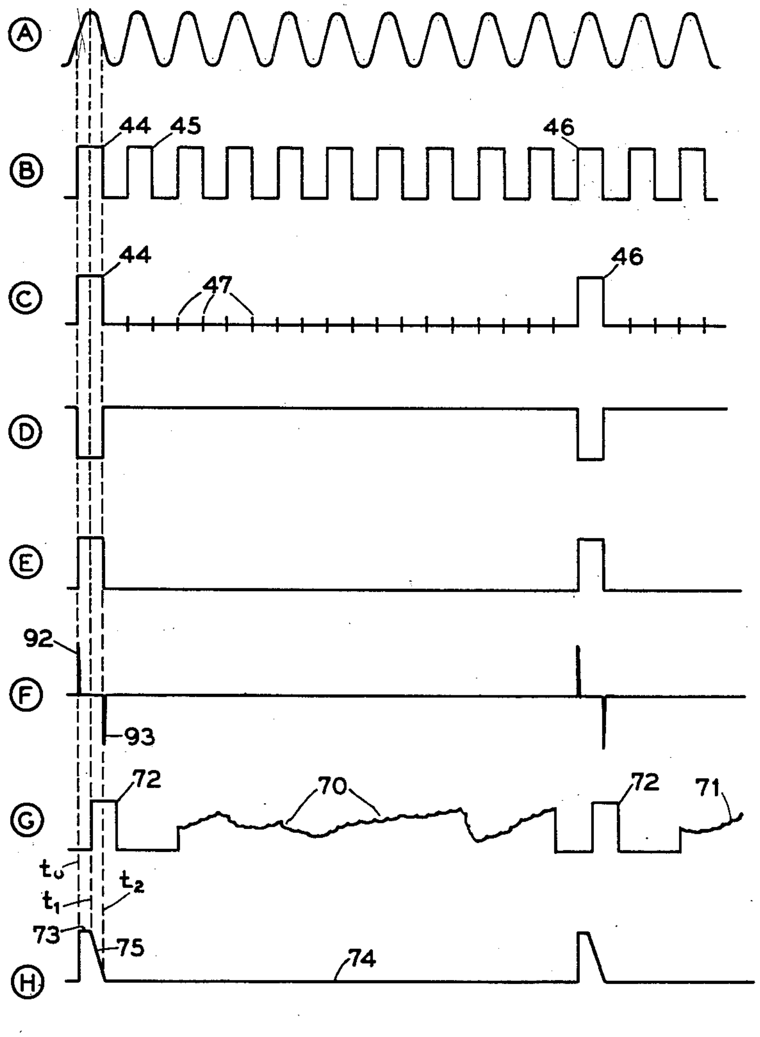
Figure 2 is a representation of waveforms which appear at various designated points in the circuit of Figure 1 and which will be referred to in describing the operation thereof.

Since the counter-gate output waveform, illustrated as C in Figure 2, includes disturbances 47, it is applied by connection 48 to an inverter-limiter 50, the output of which is applied through a coupling capacitor 51 to a junction point 52. The voltage appearing at junction point 52 across resistor 53 (D of Figure 2) is applied through wire 54 to a circuit for discharging capacitor 20 which subsequently will be described, and through wire 55 to a circuit for charging capacitor 20.

The charging circuit includes a gaseous discharge tube 60 having a bias battery 61 connected in series with resistors 62 and 63 between the cathode 64 (or ground) and grid 65. The plate 66 is connected through a charging resistor 67 to the capacitor 20. The cathode 64 is connected to wire 55 and the grid 65 is connected through resistor 63, coupling capacitor 68 and wire 69 to the signal output of facsimile receiver 10.

In operation, the received facsimile signal on wire 69 is as represented by G of Figure 2. The fluctuations 70 correspond to one point-by-point line of the copy transmitted by a facsimile transmitter. The beginning of the next adjacent line is designated 71. Transmitter synchronizing pulses 72 are received between the signals corresponding to lines of copy. Tube 60 is biased by such an amount that it will not conduct unless there is simultaneously present a negative pulse on cathode 64 from junction point 52 and a positive synchronizing pulse on grid 65 from receiver 10. During the time that the pulses coincide in time, the tube 60 conducts, drawing a current from capacitor 20 through charging resistor 67. The voltage on the ungrounded side of capacitor 20 is thus lowered from a base value 73 to a more negative value 74 (H of Figure 2). The value of the resulting charge is determined by circuit constants and the charging duration $t_1$—$t_2$, i. e., the time during which the pulses 44 and 72 coincide. The charge on the capacitor 20 determines the frequency of the variable frequency oscillator 17. The charge and frequency remain constant for all practical purposes during the interval between pulses or the time it takes to scan one line with present and contemplated equipment. By the selection of charging circuit elements to provide the proper time constant, the charging curve 75 may be made practically linear so that the frequency-determining voltage 74 is a linear function of the overlap duration $t_1$—$t_2$ of pulses 44 and 72. The frequency of oscillator 17 may therefore be adjusted to the correct value in one cycle, there being no hunting or inertia effects.

Having described the means whereby capacitor 20 is charged, the means for discharging the capacitor will now be considered. Waveform D at junction point 52 is applied to inverter-limiter 80 from which it emerges as waveform E. Waveform E is applied to differentiator 81 consisting of capacitor 82 and resistor 83. The output of differentiator 81, having waveform F, is applied to grid 84 of vacuum tube 85. The plate 86 of tube 85 is connected to positive B voltage; and the cathode 87 is connected through a variable resistor 88 to point 89 from which there are two paths to ground, one being through discharging resistor 90 and capacitor 20, the other being through rectifier 91. The polarity of rectifier 91 is such as to prevent discharge therethrough of the charge on capacitor 20. A grid bias source 94 is connected to resistor 83 to normally maintain tube 85 below cutoff.

In the operation of the capacitor discharging circuit, tube 85 conducts when a positive spike 92 (waveform F) is applied to grid 84. Current then flows from the B source, through tube 85 and resistor 88 to point 89 where the current divides, part going through rectifier 91 to ground and part going through discharge resistor 90 to reduce the negative voltage on the ungrounded side of capacitor 20. The discharging of capacitor 20 may be viewed in another way by considering that the current flowing through resistor 88 to ground via rectifier 91 places point 89 approximately at ground potential. Therefore, capacitor 20 is discharged to ground through resistor 90. The capacitor 20 is discharged by an amount which is a function of the charge on the capacitor, the width of spike 92 and the R-C time constant. Negative spike 93 has no effect on tube 85 since the tube is cut off at all times except when a positive spike 92 is applied.

The frequency of oscillator 17 is determined within a range of values by the charge on capacitor 20, the desired synchronized frequency being in the central portion of the range. The oscillator 17 of the system of Figure 1 may be designed so that when it is initially put into operation, the frequency is at the low end of its range of values. Since the pulses 44 and the synchronizing pulses 72 initially have different repetition rates, one pulse 44 and one pulse 72 will overlap within a small fraction of a second after the equipment is started. When this occurs, the capacitor 20 is charged up to a value which is a function of the amount of overlap of the pulses. The charge put on the capacitor 20 makes the frequency of the oscillator close enough to the synchronizing frequency so that the next pair of pulses 44 and 72 also overlap. As previously described, the capacitor 20 is discharged at time $t_0$ corresponding with the leading edge of pulse 44 and is recharged during the overlap period $t_1$-$t_2$ to a frequency-determining value 74 until the next pair of pulses appear. As is apparent from H of Figure 2, the frequency of oscillator 17 is constant during the period between pulses and corrections in frequency are made only during the occurrence of the pulses. The frequency correction made is a function of the overlap of the pulses and is substantially independent of the previous frequency of the oscillator.

Figure 3:
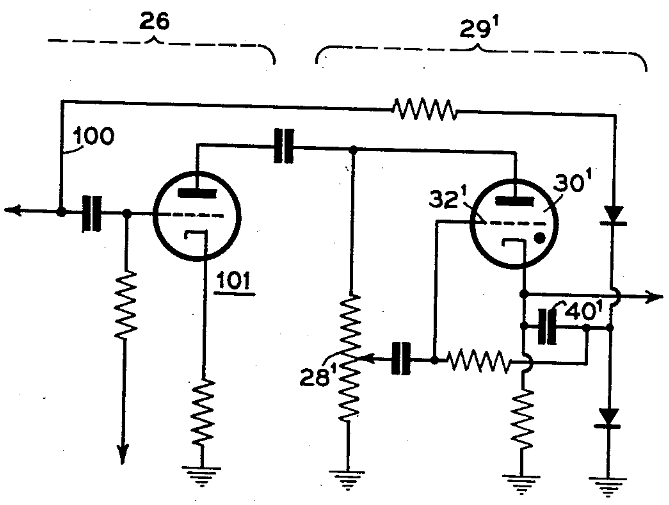
Figure 3 is an alternative form of counter-gate which may be used in place of that shown in Figure 1.
Figure 4:
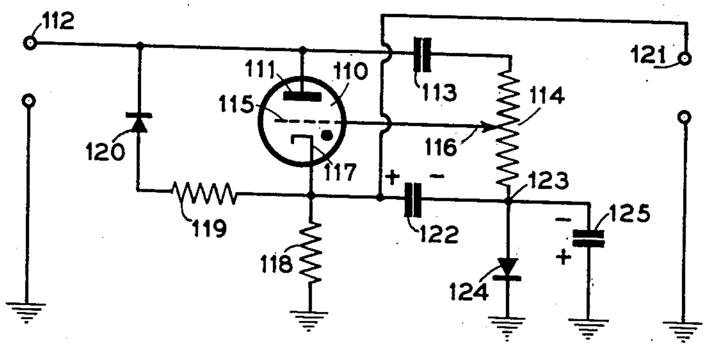
Figure 4 is another alternative form of counter-gate.

Reference now will be made to Figures 3 and 4 for descriptions of alternative forms of the counter-gate 29 of Figure 1. The counter-gate 29′ of Figure 3 differs from counter-gate 29 in that the circuit for discharging capacitor 40′ is connected by wire 100 to the input side of the next preceding stage 101 of overdriven amplifier 26, instead of to point 35 on voltage divider 28. By this arrangement, capacitor 40′ is step-by-step discharged by positive pulses during the occurrence of corresponding negative pulses on voltage divider 28′ and grid 32′; and the ratio of the voltage on wire 100 to the maximum voltage on capacitor 40′ may be made larger than is practical in the circuit of Figure 1 so that the capacitor 40′ is discharged by more nearly equal amounts. As a result, the counter-gate of Figure 3 is more positive in operation, i. e., there is less possibility of tube 30′ firing on the occurrence of a pulse other than the predetermined $n$th positive pulse.

The counter-gate of Figure 4 is also positive and consistent in operation by reason of its nearly equal capacitor discharge steps. Like the form shown in Figure 3, it counts the negative pulses and gates the $n$th positive pulse. A gaseous tube 110 has its plate 111 connected to input terminal 112 and through a capacitor 113 to a voltage divider 114. The grid 115 of tube 110 is connected to tap 116 on voltage divider 114. The cathode 117 is connected through output resistor 118 to ground, through discharging resistor 119 and rectifier 120 to input terminal 112, to output terminal 121, and through bias-storing capacitor 122 to point 123 which is connected to the lower end of voltage divider 114, rectifier 124 and capacitor 125.

When a positive pulse is initially applied from terminal 112 through capacitor 113 and part of voltage divider 114 to grid 115, the tube 110 fires and current passes through load resistor 118 to ground. The resulting voltage drop appearing across resistor 118 causes a charge on bias-storing capacitor 122 and then this charge distributes itself on capacitors 122 and 125 in accordance with the relative values of capacitance and with the polarities indicated on the drawing. The charges on the capacitors bias the grid 115 so that subsequent positive pulses or half cycles do not render tube 110 conductive. Each subsequent negative pulse or half cycle passes from input terminal 112 through rectifier 120 and discharging resistor 119 to reduce the biasing voltage on capacitor 122. Thus when the $n$th positive pulse appears at terminal 112, the bias has been reduced to a value such that the tube 110 conducts and gives a corresponding output pulse on terminal 121 across load resistor 118. The tube always starts to conduct at the beginning of the $n$th pulse because capacitor 113 and voltage divider 114 act as a differentiator so that a starting spike is applied to the grid 115 of the tube. The circuit of Figure 4 is characterized by providing almost equal discharge steps on capacitor 122 rather than exponentially decreasing discharge steps. The tube is therefore positively fired by the $n$th positive pulse and not by the $n$-plus-one or the $n$-minus-one pulse.

Figure 5:
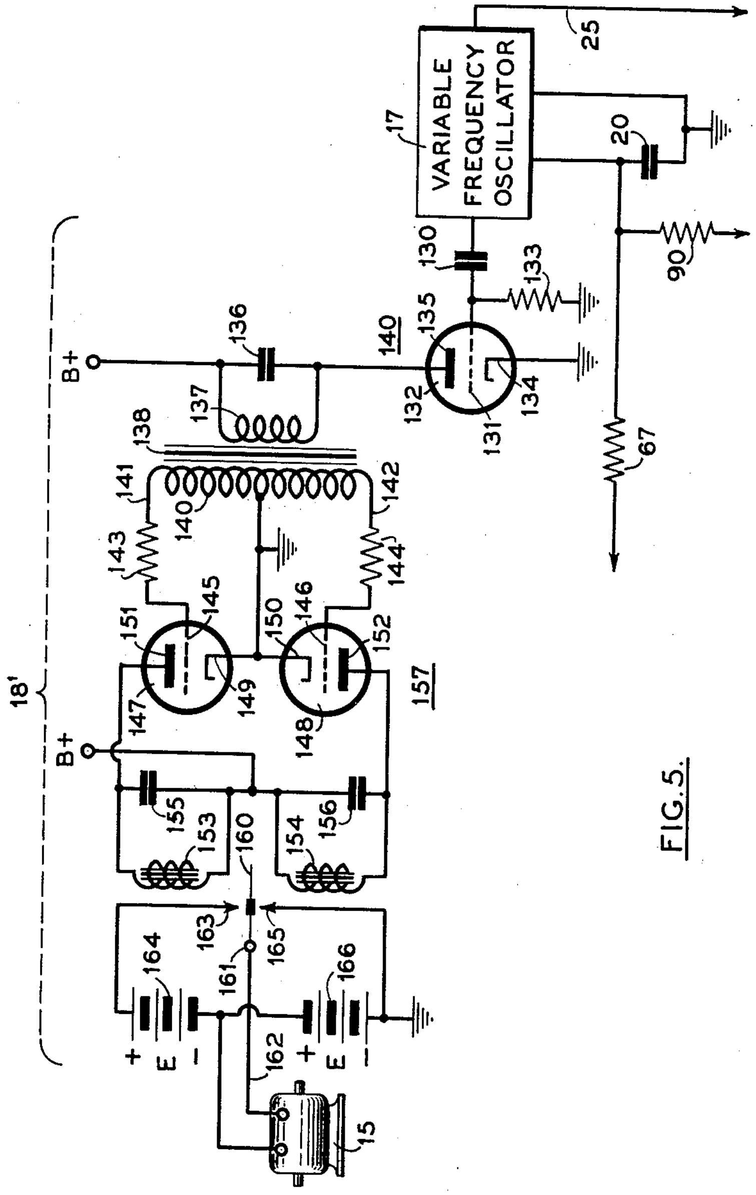
Figure 5 is a form of power amplifier which may be used between the variable-frequency oscillator and motor of Figure 1.

Reference will now be made to Figure 5 for a description of a power apparatus 18′ which may be substituted for the conventional power amplifier 18 between the variable frequency oscillator 17 and motor 15 of Figure 1. The purpose of power apparatus 18′, like that of power amplifier 18, is to generate fluctuating current in exact synchronism with the low-power variable-frequency oscillator 17 and of sufficient magnitude to drive the motor 15. The sine wave output of oscillator 17 is applied through a coupling capacitor 130 to the grid 131 of a vacuum tube 132. The grid 131 is connected through a bias resistor 133 to ground and the cathode 134 is connected to ground. The plate 135 is connected to B plus through the primary coil 137 of transformer 138 shunted by a capacitor 136. The circuit thus far described and generally designated 140 is a wave squaring circuit which transforms the sine wave output of oscillator 17 into a substantially square wave when the values of bias resistor 133 and capacitor 136 are selected in accordance with considerations well known in the art.

The secondary coil 140 of transformer 138 has its center-point grounded and its terminals 141, 142 connected through resistors 143, 144 to the grids 145, 146 of vacuum tubes 147, 148 arranged in push-pull. The cathodes 149, 150 are grounded. The plates 151, 152 are connected through the coils of electromagnets 153, 154 to B plus. Capacitors 155, 156 shunting the coils of the electromagnets tend to further improve the square wave form of the currents therein.

A reed 160 having one end pivoted at 161 and a free end disposed between electromagnets 153 and 154 is connected by wire 162 to motor 15. When reed 160 is acted on by electromagnet 153, it is drawn to fixed contact 163 connected to the positive side of D.-C. source 164 having a voltage E. When reed 160 is acted on by electromagnet 154, it is drawn to fixed contact 165 connected to ground. A second D.-C. source 166 having a voltage E is connected on one side to ground and on the other side to D.-C. source 164 and the other terminal of motor 15.

In operation, the sine wave output of oscillator 17 is squared in circuit 140 and applied to a push-pull amplifier circuit generally designated 157 having electromagnets in the output thereof which are alternately energized, one during the negative half cycle of the input voltage and the other during the positive half cycle of the input voltage. The electromagnets act on a contact-carrying reed 160 with the result that lead 162 of motor 15 is alternately connected to ground and a voltage 2E of both D.-C. sources 164 and 166 in series. The other lead of motor 15 is permanently connected to a voltage E of D.-C. source 166. A powerful alternating current in exact synchronism with the oscillating current of oscillator 17 is thus applied to drive synchronous motor 15.

While specific forms of the invention have been described in some detail, it will be understood that this has been done by way of illustration and that the scope of the invention is to be construed by reference to the appended claims.

What is claimed is:

1. In a synchronizing system, the combination of a source of received periodic synchronizing pulses, a variable-frequency oscillator having a frequency-determining storage capacitor, a source of local pulses which are synchronous with the oscillator for comparison with the received pulses, a discharging circuit receptive to pulses from one of said sources and operative to discharge the capacitor, and a charging circuit receptive to pulses from both of said sources and operative to charge the capacitor to a value which is a function of the overlap time of said pulses from both sources.

2. In a synchronizing system, the combination of a source of received periodic synchronizing pulses, a variable-frequency oscillator having a frequency-determining storage capacitor, a source of local pulses which are synchronous with the oscillator and which have a repetition rate and a fixed width of the same order of magnitude as the repetition rate and width of the received pulses, a discharging circuit receptive to pulses from one of said sources and operative to discharge the capacitor, and a charging circuit receptive to pulses from both of said sources and operative to charge the capacitor to a value determined by the overlap time of said pulses from both sources.

3. In a synchronizing system, the combination of a source of received periodic synchronizing pulses, a variable-frequency oscillator having a frequency-determining energy-storage element, a source of local pulses including electronic counter-gate means operative responsively to the oscillator to generate a local pulse during every $n$th cycle of the oscillator, and further electronic means receptive to said received synchronizing pulses and said local pulses and operative responsively to a pulse from one of said sources to set the energy-storage element to a reference condition and then operative to reset the energy-storage element to a condition representative of the overlap time of the pulses from both of said sources, whereby the variable-frequency oscillator is continuously synchronized with the received synchronizing pulses in the ratio of $n$ cycles per received pulse.

4. In a synchronizing system, the combination of a source of received periodic synchronizing pulses, a variable-frequency oscillator having a frequency-determining storage capacitor, a source of local pulses including an electronic counter-gate operative responsively to the oscillator to generate a local pulse during every $n$th cycle of the oscillator, and electronic means receptive to said received synchronizing pulses and said local pulses and operative responsively to a pulse from one of said sources to discharge the capacitor to a reference voltage and then operative to charge the capacitor to a voltage which is a function of the overlap time of the pulses from both of said sources.

5. In a synchronizing system responsive to received periodic synchronizing pulses, the combination of a variable-frequency oscillator having a frequency-determining storage capacitor, an electronic counter-gate operative responsively to the oscillator to generate a local pulse during every $n$th cycle of the oscillator, means responsive to the leading edge of said local pulse to discharge the frequency-determining capacitor, and thyratron means responsive to the local pulse and the received synchronizing pulse to recharge the capacitor to a voltage which is a function of the overlap time of said pulses.

6. In a system for synchronizing the speed of a synchronous motor with received periodic synchronizing pulses, the combination of: a variable-frequency oscillator having a frequency-determining storage capacitor, a power amplifier receptive to the output of the oscillator and operative to supply power to drive the synchronous motor, a counter-gate operative responsively to the oscillator to generate a local pulse during every $n$th cycle of the oscillator, means responsive to the leading edge of said local pulse to discharge the frequency-determining capacitor, and means responsive to the local pulse and the received synchronizing pulse to recharge the capacitor to a voltage which is a function of the overlap time of said pulses.

7. In a system for synchronizing the speed of a synchronous motor with received periodic synchronizing pulses, the combination of: a variable-frequency oscillator having a frequency-determining storage capacitor, a source of direct current and a vibrator-type inverter connected thereto, the inverter being synchronously responsive to the output of the oscillator and operative to supply power to drive the synchronous motor, and means for discharging and immediately recharging the capacitor each time a synchronizing pulse is received.

8. The method of synchronizing an oscillator, having a frequency-determining storage capacitor, with a periodic received pulse in the ratio of $n$ cycles per received pulse, comprising the steps of: generating a local pulse during every $n$th cycle of the oscillator, discharging the capacitor responsively to the leading edge of said local pulse, and recharging the capacitor during the overlap time of the received pulse and the local pulse.

9. A counter-gate receptive to an input signal of periodic pulses comprising a gaseous discharge tube having a cathode, a grid and a plate; a cathode load resistor; a grid-biasing storage capacitor in circuit between the cathode and grid so that when the capacitor is charged in excess of a predetermined amount the tube is cut off; means for applying the input signal to the grid; and a circuit, including unidirectional means, receptive to the input signal and connected to the capacitor to permit the capacitor to become charged upon receipt of the first pulse thereby cutting off the tube, and operative progressively to discharge the capacitor on receipt of subsequent pulses, the charge on the capacitor being reduced after receipt of a predetermined number of pulses to the point where the following pulse applied to the grid causes the tube to conduct for the duration of said pulse; whereby the equivalent of every $n$th pulse of the signal appears across the cathode load resistor; whereby the tube conducts upon receipt of every $n$th pulse of the signal.

FRANK A. HESTER.

REFERENCES CITED

The following references are of record in the file of this patent:

FOREIGN PATENTS

| Number | Country | Date |
|---|---|---|
| 486,017 | Great Britain | May 27, 1938 |